Figure 1:
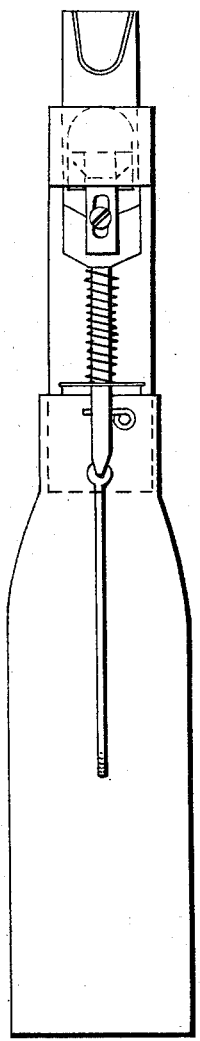
Figure 2:
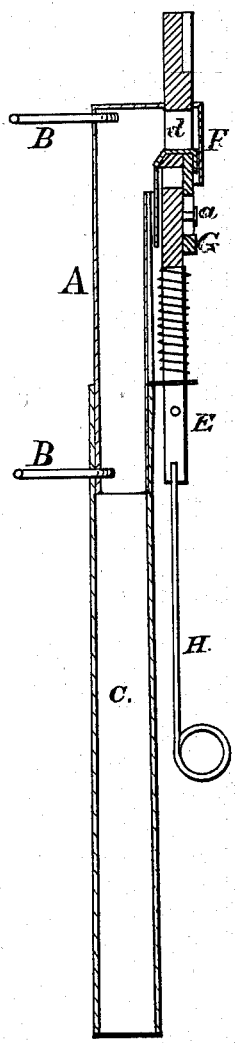

H. MAXELL.
Hand-Seeder.

No. 62,280.  Patented Feb. 19, 1867.

Witnesses:  Inventor:

United States Patent Office.

HENRY MAXELL, OF CANTON, OHIO, ASSIGNOR TO HIMSELF AND LEVI LONGABAUGH.

Letters Patent No. 62,280, dated February 19, 1867.

IMPROVEMENT IN CORN PLANTERS.

*The Schedule referred to in these Letters Patent and making part of the same.*

TO ALL WHOM IT MAY CONCERN:

Be it known that I, HENRY MAXELL, of Canton, in the county of Stark, and in the State of Ohio, have invented new and useful improvements in Corn Planters; and do hereby declare that the following is a full, clear, and exact description thereof, reference being had to the accompanying drawings, and to the letters of reference marked thereon.

In the accompanying drawings, A represents a metallic box or case, which is connected and secured to the handle of any ordinary hoe by means of the metallic hooks B B. This box is closed at its lower end and open at its upper. Connected to the upper end of the box is a bag, C, constructed of any suitable material, and intended to contain corn. This sack or bag runs up the hoe handle and is confined to it in any suitable manner. The sack or bag is filled with corn, which falls into the box A as fast as it is carried out from said box by the seed-slide. D represents the seed-slide, which I propose to make of wood. This slide lies close to the box A, and is provided with an opening, $d$, which is intended to receive corn from box A to be dropped. An opening is cut in the lower portion of box A, on the side next to the slide D, to admit the corn to the opening in said slide. A metallic band, F, fits over the said slide D opposite the opening in the box A. G represents a gauge, which is provided with a slot in which a screw, $a$, passes to connect and station it to the seed-slide. A portion of this gauge fits in the opening $d$ in the seed-slide. This gauge serves to open or close partially the opening in the seed-slide to regulate the amount of corn which shall pass into said opening. E represents a stem to the slide D, which passes up the box A on its outside, and through a keeper secured to said box. A coiled wire spring surrounds this stem, and serves to draw the stem downwards. A rod, H, with a loop in its upper end, is secured to the stem E for the purpose of operating the seed-slide. When it is desired to discharge corn from the box A, the seed-slide is allowed to go down its full distance, and then, when the corn falls into the opening $d$ of the slide, said slide is drawn up by rod H until its opening passes beyond the band F; as soon as it passes the band F, the corn drops from the opening $d$ and falls to the ground. The seed-slide is allowed to pass down again, and is again supplied with corn, which is discharged by the operator at the moment he desires it by simply drawing the slide up by means of the rod H. These droppers may be attached to any garden or field hoe when corn is to be planted or replanted, and removed again readily after the work is performed.

Having thus fully described my invention, what I claim as new, and desire to secure by Letters Patent, is—

The arrangement of the box A, sack C, hooks B B, seed-slide D, as constructed and provided with its gauge, spring, and rod H, when the several parts are combined and used as and for the purpose specified.

In testimony that I claim the foregoing I have hereunto set my hand and seal this 27th day of December, 1866.

HENRY MAXELL.

Witnesses:
JOSEPH HEINRICH,
JOHN A. BALL.